(12) United States Patent
Hadame et al.

(10) Patent No.: US 10,971,735 B2
(45) Date of Patent: Apr. 6, 2021

(54) ELECTROCHEMICAL CELL AND ELECTROCHEMICAL APPARATUS

(71) Applicant: KABUSHIKI KAISHA TOSHIBA, Minato-ku (JP)

(72) Inventors: Yasuaki Hadame, Arakawa (JP); Masayuki Tanaka, Wakayama (JP); Naoya Akaishi, Yamato (JP); Takahiro Terada, Yokohama (JP); Shinji Nakata, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 95 days.

(21) Appl. No.: 16/174,564

(22) Filed: Oct. 30, 2018

(65) Prior Publication Data
US 2019/0131632 A1    May 2, 2019

(30) Foreign Application Priority Data

Oct. 31, 2017  (JP) .............................. JP2017-211275

(51) Int. Cl.
| | |
|---|---|
| *H01M 4/86* | (2006.01) |
| *H01M 4/90* | (2006.01) |
| *H01M 8/1213* | (2016.01) |
| *C25B 11/032* | (2021.01) |
| *C25B 11/03* | (2021.01) |
| *H01M 8/023* | (2016.01) |
| *H01M 8/18* | (2006.01) |
| *H01M 8/04291* | (2016.01) |

(Continued)

(52) U.S. Cl.
CPC ............ *H01M 8/023* (2013.01); *C25B 11/03* (2013.01); *C25B 11/032* (2021.01); *H01M 4/8621* (2013.01); *H01M 4/8652* (2013.01); *H01M 4/9066* (2013.01); *H01M 8/04291* (2013.01); *H01M 8/0631* (2013.01); *H01M 8/1213* (2013.01); *H01M 8/186* (2013.01); *H01M 8/2432* (2016.02); *H01M 2008/1293* (2013.01)

(58) Field of Classification Search
None
See application file for complete search history.

(56) References Cited

U.S. PATENT DOCUMENTS

| | | | | |
|---|---|---|---|---|
| 6,565,763 | B1 * | 5/2003 | Asakawa | ............... C03C 17/007 |
| | | | | 216/56 |
| 2010/0151348 | A1 * | 6/2010 | Higashi | ............... H01M 4/8621 |
| | | | | 429/479 |

FOREIGN PATENT DOCUMENTS

| | | |
|---|---|---|
| JP | 5-214574 A | 8/1993 |
| JP | 7-37596 A | 2/1995 |

(Continued)

*Primary Examiner* — Jonathan Crepeau
(74) *Attorney, Agent, or Firm* — Oblon, McClelland, Maier & Neustadt, L.L.P.

(57) ABSTRACT

An electrochemical cell according to one embodiment includes a solid electrolyte layer having insulating property, a first electrode, and a second electrode. The solid electrolyte layer has a first face and a second face, and allows ions to move therethrough. The first electrode is one of an anode and a cathode and provided on the first face. The first electrode includes an inside channel that allows gas to flow, a third face into which a first open end of the channel opens, a fourth face into which a second open end of the channel opens, and an inner wall face that defines the channel. The second electrode is the other of the anode and the cathode and provided on the second face.

10 Claims, 8 Drawing Sheets

(51) Int. Cl.
*H01M 8/0612* (2016.01)
*H01M 8/2432* (2016.01)
*H01M 8/124* (2016.01)

(56) References Cited

FOREIGN PATENT DOCUMENTS

| JP | 7-230815 A | 8/1995 |
| JP | 2010-65276 A | 3/2010 |
| WO | WO 2007/034835 A1 | 3/2007 |
| WO | WO 2017/149561 A1 | 9/2017 |

* cited by examiner

FIG.7
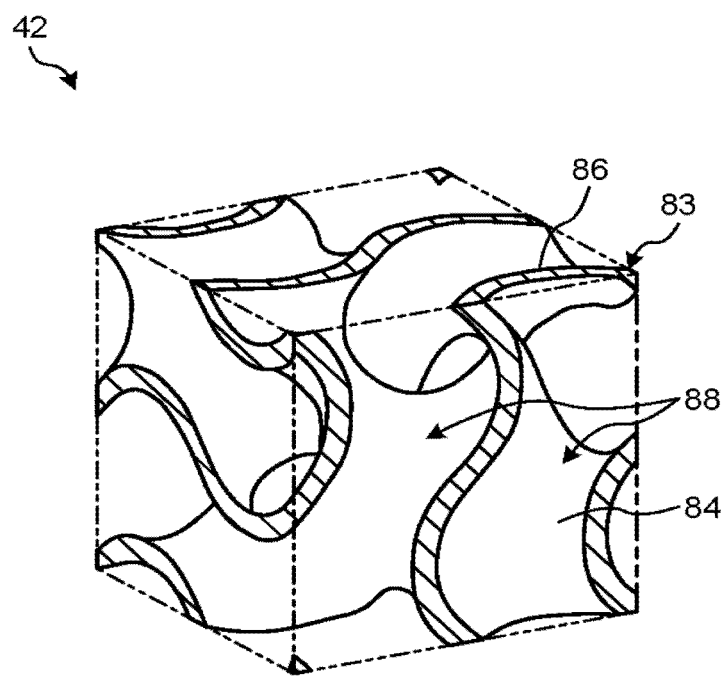
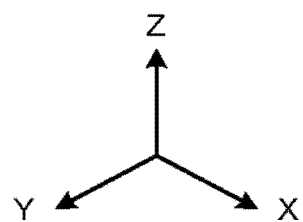

ELECTROCHEMICAL CELL AND ELECTROCHEMICAL APPARATUS

CROSS-REFERENCE TO RELATED APPLICATIONS

This application is based upon and claims the benefit of priority from Japanese Patent Application No. 2017-211275, filed on Oct. 31, 2017, the entire contents of which are incorporated herein by reference.

FIELD

Embodiments described herein relate generally to an electrochemical cell and an electrochemical apparatus.

BACKGROUND

Electrochemical cells are used, for example, to extract electric energy or for electrolysis by electrochemical reaction. Electrochemical reaction occurs at an electrode of an electrochemical cell. In forming an electrode from a pore-forming material or by thermal spraying, for example, voids, through which gas such as fuel gas can pass, are formed among the particles of the electrode.

Improvement in the efficiency of electrochemical reaction will lead to enhancing the efficiency of power extraction from and electrolysis by the electrochemical cell.

BRIEF DESCRIPTION OF THE DRAWINGS

FIG. 7 is an exemplary perspective view illustrating a part of a hydrogen electrode in the embodiment.

DETAILED DESCRIPTION

In general, according to one embodiment, an electrochemical cell includes a solid electrolyte layer, a first electrode, and a second electrode. The solid electrolyte layer has a first face and a second face, the solid electrolyte layer having insulating property and allowing ions to move therethrough. The first electrode is one of an anode and a cathode, the first electrode being provided on the first face, the first electrode provided with an inside channel, the first electrode including a third face, a fourth face, and an inner wall face, the channel through which gas passes, the third face into which a first open end of the channel opens, the fourth face into which a second open end of the channel opens, the inner wall face that defines the channel. The second electrode is the other of the anode and the cathode, the second electrode being provided on the second face.

One embodiment is described below with reference to FIG. 1 to FIG. 8. In the present specification, basically, vertically upward direction is defined as "upward", and vertically downward direction is defined as "downward". In the present, specification, components according to the embodiment may be expressed and described in a plurality of manners. The components may be expressed and described in different manners that are not described herein. Components and descriptions not expressed in a plurality of manners may be expressed in other manners that are not described herein.

Figure 1:
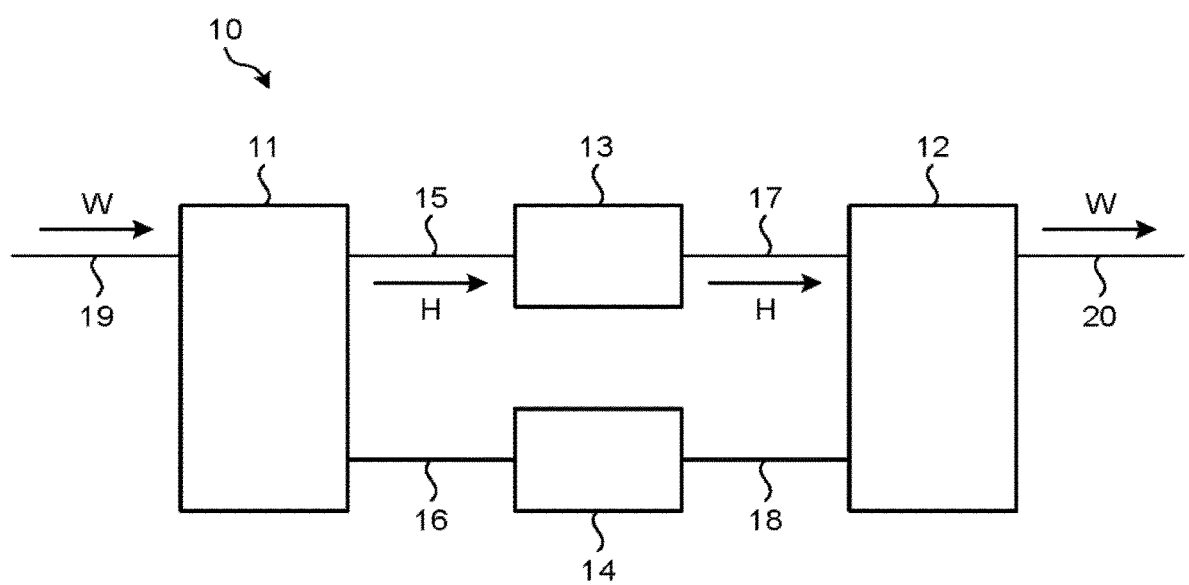
FIG. 1 is an exemplary block diagram schematically illustrating a power system according to one embodiment.

FIG. 1 is an exemplary block diagram schematically illustrating a power system 10 according to one embodiment. The power system 10 is an example of an electrochemical apparatus. In the present embodiment the power system 10 represents a hydrogen power storage system. The electrochemical apparatus is not limited to this example.

As illustrated in FIG. 1, the power system 10 includes a solid oxide electrolysis cell (SOEC) 11, a solid oxide fuel cell (SOFC) 12, a hydrogen storage 13, a heat storage 14, and pipes 15, 16, 17, 18, 19, and 20. For example, the SOEC 11 and the SOFC 12 may be referred to as electrochemical devices. The pipe 19 is an example of a supplier.

The SOEC 11 is connected to the hydrogen storage 13 through the pipe 15, and is connected to the heat storage 14 through the pipe 16. The SOFC 12 is connected to the hydrogen storage 13 through the pipe 17, and is connected to the heat storage 14 through the pipe 18.

Supplied with water vapor W and power, the SOEC 11 electrolyses the water vapor W into hydrogen H and oxygen. The water vapor W is an example of gas. For example, the water vapor W is increased in temperature to 800° C. and supplied to the SOEC 11 from the pipe 19. Most of the water vapor W is in a gas phase, but the water vapor W may include water in a liquid phase. The water vapor W supplied to the SOEC 11 is not limited to this example.

The power system 10 may include a power source, such as a solar generator, a wind generator, or a hydrogenerator. Electric power is supplied to the SOEC 11 from the power source. Electric power may be supplied to the SOEC 11 from an external power source. For example, surplus power is supplied to the SOEC 11.

The hydrogen H generated by electrolysis is supplied from the SOEC 11 to the hydrogen storage 13 through the pipe 15. The hydrogen storage 13 stores therein the hydrogen H. The power system 10 may include an oxygen storage in which the oxygen generated by electrolysis is stored. Oxygen generated by electrolysis may be released to the air.

The hydrogen H is supplied from the hydrogen storage 13 to the SOFC 12 through the pipe 17. The SOFC 12 is supplied with oxygen from the oxygen storage or oxygen contained in the air. The SOFC 12 generates power from the hydrogen H and the oxygen. Water W generated by the SOFC 12 is discharged from the pipe 20.

The heat storage 14 supplies heat to the SOEC 11 through the pipe 16 for electrolysis by endothermic reaction. The SOFC 12 generates power by exothermal reaction and supplies heat to the heat storage 14 through the pipe IS.

Figure 2:
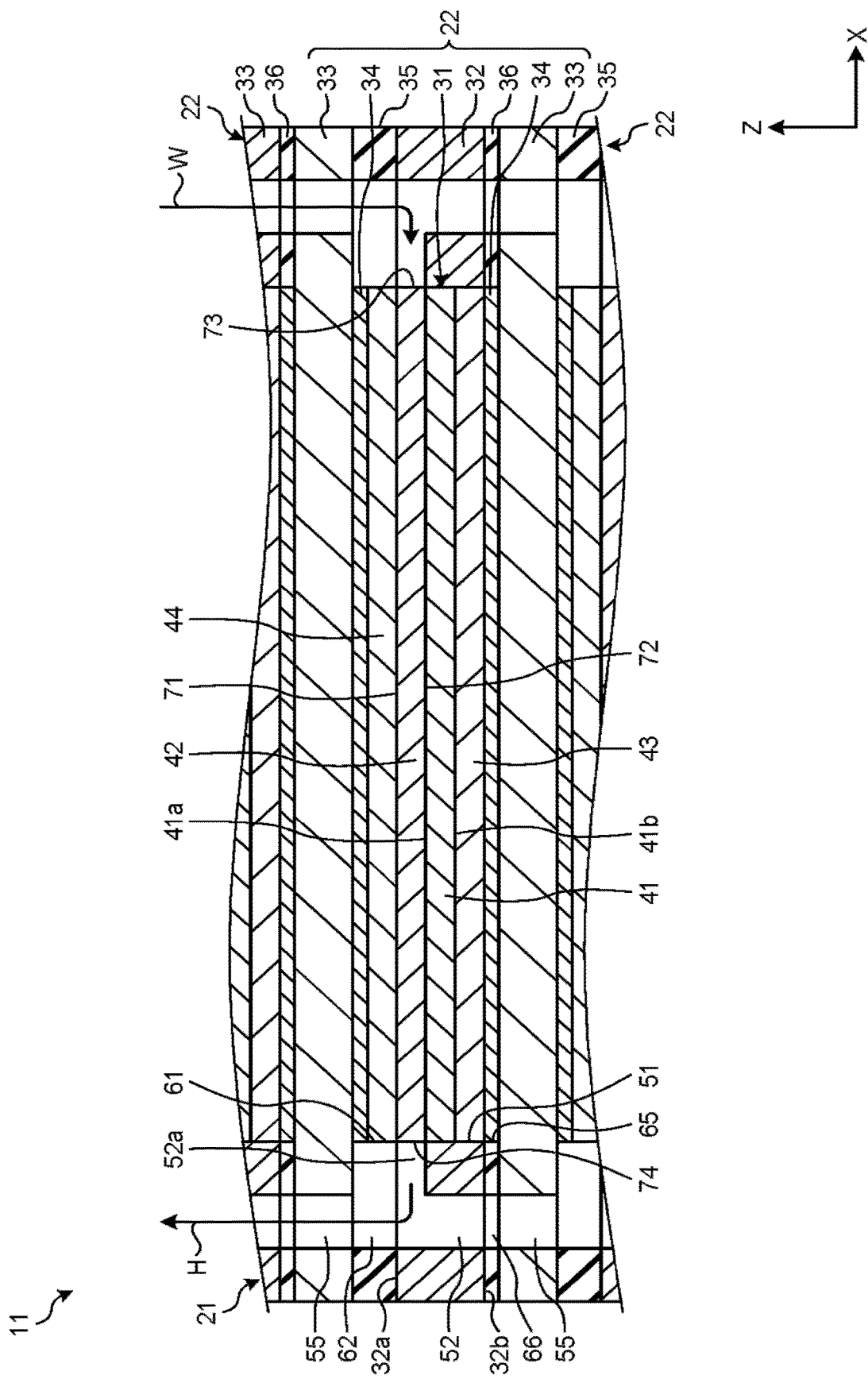
FIG. 2 is an exemplary cross-sectional view illustrating a part of an SOEC in the embodiment.

FIG. 2 is an exemplary cross-sectional view illustrating a part of the SOEC 11 according to the embodiment. As illustrated in FIG. 2, the SOEC 11 includes a cell stack 21. The cell stack 21 includes a plurality of unit cells 22.

As illustrated in the figures, an X axis, a Y axis, and a Z axis are defined herein. The X axis, the Y axis, and the Z axis are orthogonal to one another. The X axis is along the width of the unit cell 22. The Y axis is along the length (depth) of the unit cell 22. The Z axis is along the thickness of the unit cell 22.

The unit cells 22 are stacked in a Z-axis direction. The cell stack 21 may further include a heat exchanger. The heat exchanger exchanges heat among the stacked unit cells 22, and controls temperature distribution of the unit cells 22.

Figure 3:
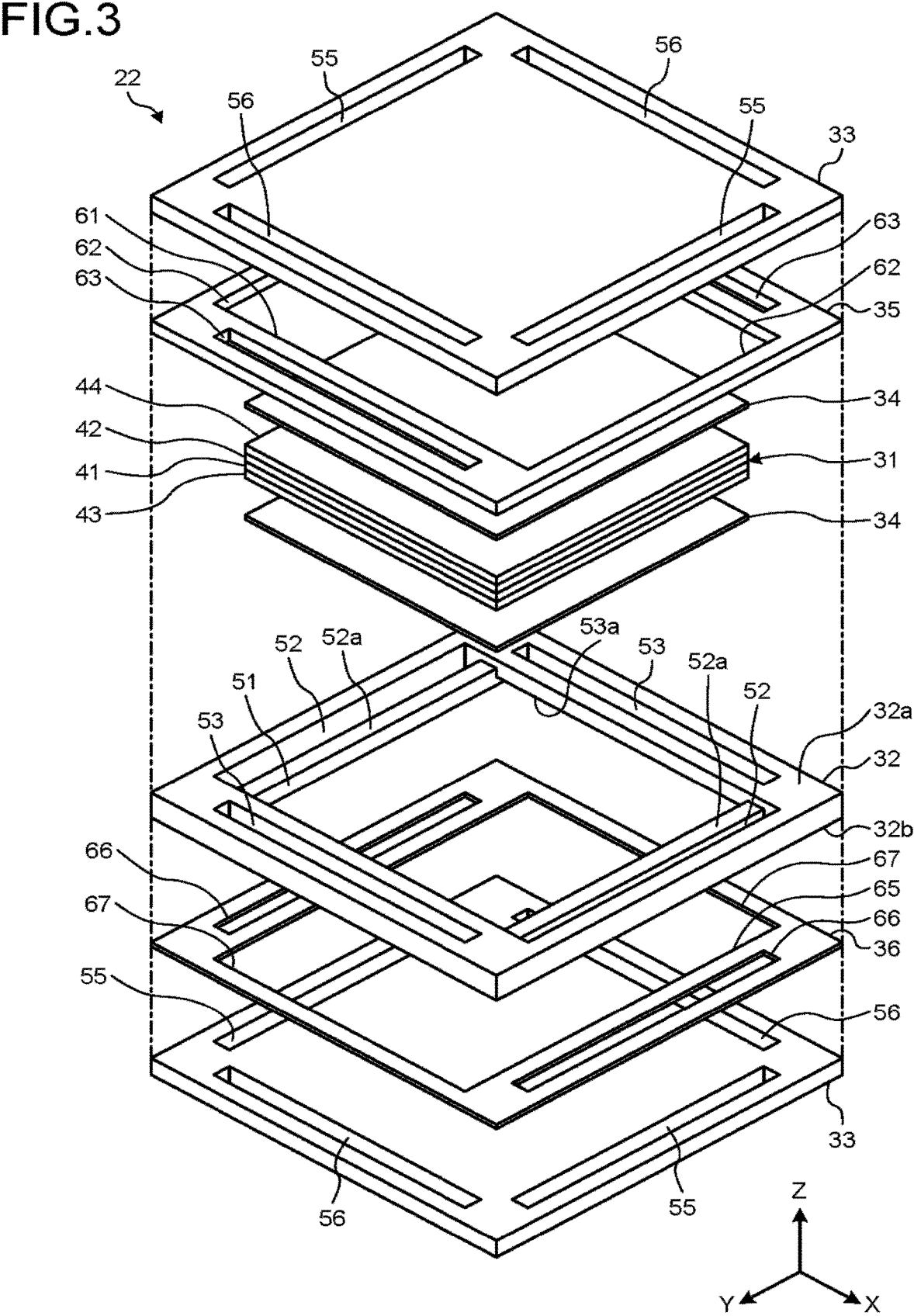
FIG. 3 is an exemplary exploded perspective view illustrating a unit cell in the embodiment.

FIG. 3 is an exemplary exploded perspective view illustrating the unit cell 22 according to the embodiment. As illustrated in FIG. 3, the unit cell 22 includes an electrochemical cell 31, a holder 32, two-separators 33, two current collector 34, a first seal 35, and a second seal 36. The current collectors 34 may be omitted. The separators 33 are each shared by two adjacent unit cells 22.

The electrochemical cell 31 has, for example, a substantially rectangular plate shape extending on the X-Y plane. The electrochemical cell 31 may have another shape such as a disc shape. The electrochemical cell 31 includes a solid electrolyte layer 41, a hydrogen electrode 42, an oxygen electrode 43, and a support 44. The hydrogen electrode 42 is an example of a first electrode. The oxygen electrode 43 is an example of a second electrode. The hydrogen electrode 42 may be art example of the second electrode, and the oxygen electrode 43 may be an example of the first electrode. The support 44 may be omitted.

The solid electrolyte layer 41, the hydrogen electrode 42, the oxygen electrode 43, and the support 44 each have a substantially rectangular plate shape extending on the X-Y plane. The solid electrolyte layer 41, the hydrogen electrode 42, the oxygen, electrode 43, and the support 44 may have another shape such as a disc shape. The solid electrolyte layer 41, the hydrogen electrode 42, the oxygen electrode 43, and the support 44 are stacked in a Z-axis direction.

As illustrated in FIG. 2, the solid electrolyte layer 41 has a first principal surface 41a and a second principal surface 41b. The first principal surface 41a is an example of a first face. The second principal surface 41b is an example of a second face.

The first principal surface 41a is substantially flat, facing in a positive Z-axis direction as indicated by the arrow of Z axis. The second principal surface 41b is substantially flat, facing in a negative Z-axis direction opposite to the arrow of Z axis. The second principal surface 41b is opposite the first principal surface 41a.

The hydrogen electrode 42 is provided on the first principal surface 41a, serving as a cathode of the electrochemical cell 31. The hydrogen electrode 42 is bonded to the first principal surface 41a. The oxygen electrode 43 is provided on the second principal surface 41b, serving as an anode of the electrochemical cell 31. The oxygen electrode 43 is bonded to the second principal surface 41b. The oxygen electrode 43 may be smaller in size than each of the solid electrolyte layer 41, the hydrogen electrode 42, and the support 44.

The solid electrolyte layer 41 is located between the hydrogen electrode 42 and the oxygen electrode 43. The support 44 is placed on the hydrogen electrode 42. Thus, the hydrogen electrode 42 is located between the solid electrolyte layer 41 and the support 44.

The solid electrolyte layer 41 is made of solid oxide having electron insulating property and ion conductivity. Specifically, the solid electrolyte layer 41 has insulating property, and ions are movable through the solid electrolyte layer 41. In the present embodiment, the solid electrolyte layer 41 is made of zirconia-based oxide. The material of the solid electrolyte layer 41 may be another solid electrolyte.

Examples of the solid electrolyte include ceramics having ion conductivity, such as ceria-based oxides doped with samarium or gadolinium, lanthanum gallate-based oxides doped with strontium or magnesium, and zirconia-based oxides doped with scandium or yttrium.

The solid electrolyte layer 41 has denseness sufficient to substantially ignore gas leakage. In other words, the solid electrolyte layer 41 restricts the movement of gas.

The hydrogen electrode 42 is, for example, made of a mixture of a metal catalyst and a ceramics material having ion conductivity. In the present embodiment, the hydrogen electrode 42 is made of a mixture of nickel and zirconia-based oxide. The material of the hydrogen electrode 42 may be a metal catalyst or another hydrogen electrode material.

Examples of the metal catalyst used as the material of the hydrogen electrode 42 include nickel, iron, cobalt, and precious metals, all of which are stable in a reducing atmosphere and have hydrogen oxidation activity. Examples of the precious metals include platinum, ruthenium, and palladium.

Examples of the ceramics material having ion conductivity used as the material of the hydrogen electrode 42 include ceria-based oxides doped with samarium or gadolinium and having fluorite structures, zirconia-based oxides doped with scandium or yttrium, and lanthanum gallate-based oxides doped with strontium or magnesium and having perovskite structures.

In the present embodiment, the oxygen electrode 43 is made of lanthanum strontium oxide. The material of the oxygen electrode 43 may be another oxygen electrode material. Examples of the oxygen electrode material include $(Sm,Sr)CoO_3$, $(La,Sr)MnO_3$, $(La,Sr)CoO_3$, $(La,Sr)(Fe,Co)O_3$, and $(La,Sr)(Fe,Co,Ni)O_3$.

The support 44 is, for example, made of the same or similar material to the material of the hydrogen electrode 42. The support 44 may be made of another material. The support 44 works to improve the mechanical strength of the electrochemical cell 31. Gas such as the water vapor W and hydrogen H can pass through the inside of the support 44. The support 44 may have denseness sufficient to restrict the gas from passing.

The holder 32 is, for example, made of metal, glass, or ceramics, and has resistance against reaction gas and the other members. The holder 32 has a substantially rectangular frame shape, and includes a top face 32a and a bottom face 32b. The top face 32a is substantially flat, facing in the positive Z-axis direction. The bottom face 32b is substantially flat, facing in the negative Z-axis direction.

As illustrated in FIG. 3, the holder 32 is provided with an opening 51, two first supply paths 52, and two second supply paths 53. The opening 51, the first supply paths 52, and the second supply paths 53 open into the top face 32a and the bottom face 32b through the holder 32 in the Z-axis direction.

The opening 51 is located substantially at the center of the holder 32. The electrochemical cell 31 is held inside the opening 51. As illustrated in FIG. 2, a part of the electrochemical cell 31 may be located outside the opening 51.

The unit cell 22 may include, for example, a filler containing glass or inorganic powder between the electrochemical cell 31 housed in the opening 51 and the holder 32. Examples of the glass include high-melting crystallized glass that becomes solid at 800° C. Examples of the inorganic powder include ceramics and glass.

As illustrated in FIG. 3, the first supply paths 52 extend in the Y-axis direction. The opening 51 is located between the two first supply paths 52. The two first supply paths 52 each include a connection 52a. The connection 52a opens into the top face 32a of the holder 32 and communicates with the opening 51. Specifically, the opening 51 and the first supply paths 52 are in communication with each other near the top face 32a.

The second supply paths 53 extend in the X-axis direction. The opening 51 is located between the two second supply paths 53. The two second supply paths 53 each include a connection 53a. The connection 53a opens into the bottom face 32b of the holder 32 and communicates with the opening 51. Specifically, the opening 51 and the second supply paths 53 are in communication with each other near the bottom face 32b.

The separators 33 have, for example, a substantially rectangular plate shape extending on the X-Y plane. The separator 33 may have another shape. The separators 33 are made of material having conductivity and resistance to reaction gas and the other members.

The separators 33 are each provided with two first supply paths 33 and two second supply paths 56. The first, supply paths 35 and the second supply paths 56 pass through the separators 33 in the Z-axis direction.

The current collectors 34 have, for example, a substantially rectangular plate shape extending on the X-Y plane. The current collectors 34 may have another shape. For example, the current, collectors 34 are made of material containing nickel, gold, silver, or platinum, and has conductivity.

The hydrogen electrode 42 of the electrochemical cell 31 is electrically connected to one of the separators 33 through the support 44 and one of the current collectors 34. The oxygen electrode 43 of the electrochemical cell 31 is electrically connected to the other separator 33 through the other current collector 34. The other current collector 34 has oxidation resistance.

The electrochemical cell 31 and the two current collectors 34 are located between the two separators 33. The electrochemical cell 31 is located between the two current collectors 34. The electrochemical cell 31, the current collectors 34, and the separators 33 are laminated in contact with one another.

The current collectors 34 are, for example, mesh, felt, or punching-metal laminated porous materials. Thus, gas such as water vapor W and hydrogen H can pass through the inside of the current collectors 34. The current collectors 34 may be thin and have denseness sufficient to restrict the gas from passing.

The first seal 35 is, for example, made of material containing glass, and has a substantially rectangular frame shape. The first seal 35 is provided with an opening 61, two first supply paths 62, and two second supply paths 63. The opening 61, the first supply paths 62, and the second supply paths 63 pass through the first seal 35 in the Z-axis direction.

The opening 61 is provided substantially at the center of the first seal 35. One of the current collectors 34 and a part of the electrochemical cell 31 are held inside the opening 61. The first supply paths 62 extend in the Y-axis direction. The opening 61 is located between the two first supply paths 62. In the present embodiment, the opening 61 and the first supply paths 62 are in communication with each other, forming one opening. The second supply paths 63 extend in the X-axis direction. The opening 61 is located between the two second supply paths 63.

The first seal 35 lies between the top face 32a of the holder 32 and one of the separators 33. For example, the first seal 35 works to improve air-tightness between the electrochemical cell 31 and the separator 33.

The second seal 36 is, for example, made of material containing glass, and has a substantially rectangular frame shape. The second seal 36 is provided with an opening 65, two first supply paths 66, and two second supply paths 67. The opening 65, the first supply paths 66, and the second supply paths 67 pass through the second seal 36 in the Z-axis direction.

The opening 65 is provided substantially at the center of the second seal 36. The other current collector 34 is held inside the opening 65. The first supply paths 66 extend in the Y-axis direction. The opening 65 is located between the two first supply paths 66. The second supply paths 67 extend in the X-axis direction. The opening 65 is located between the two second supply paths 67. In the present embodiment, the opening 65 and the second supply paths 67 are in communication with each other, forming one opening.

The second seal 36 lies between the bottom face 32b of the holder 32 and the other separator 33. For example, the second seal 36 works to improve air-tightness between the electrochemical cell 31 and the separator 33.

The first supply paths 52, 55, 62, and 66 of the holder 32, the separator 33, the first seal 35, and the second seal 36 are in communication with one another. In the SOEC 11, the communicating first supply paths 52, 55, 62, and 66 form channels through which the water vapor W and the hydrogen H flow.

The second supply paths 53, 56, 63, and 67 of the holder 32, the separator 33, the first seal 35, and the second seal 36 are in communication with one another. In the SOEC 11, the communicating second supply paths 53, 56, 63, and 67 form channels through which the oxygen flows.

The hydrogen electrode 42 is described in detail below. As illustrated in FIG. 2, the hydrogen electrode 42 has a first contact face 71, a second contact face 72, a first side face 73, and a second side face 74. The first side face 73 is an example of a third face. The second side face 74 is an example of a fourth face.

The first contact face 71 is substantially flat, facing in the positive Z-axis direction. The first contact face 71 contacts with the support 44. Thus, the hydrogen electrode 42 is electrically connected to the separators 33 through the support 44 and the current collectors 34.

The second contact face 72 is substantially flat, facing in the negative Z-axis direction. The second contact face 72 is opposite the first contact face 71. The second contact face 72 contacts with the first principal surface 41a of the solid electrolyte layer 41. Ions are thus movable between the solid electrolyte layer 41 and the hydrogen electrode 42.

The first side face 73 is substantially flat, facing in a positive X-axis direction as indicated by the arrow of X-axis. The positive X-axis direction intersects the direction in which the first principal surface 41a faces, and is an example of a third direction.

The second side face 74 is substantially flat, facing in a negative X-axis direction opposite to the arrow of X axis. The negative X-axis direction intersects the direction in which the first principal surface 41a faces, and is an example of a fourth direction. The second side face 74 is opposite the first side face 73.

Figure 4:
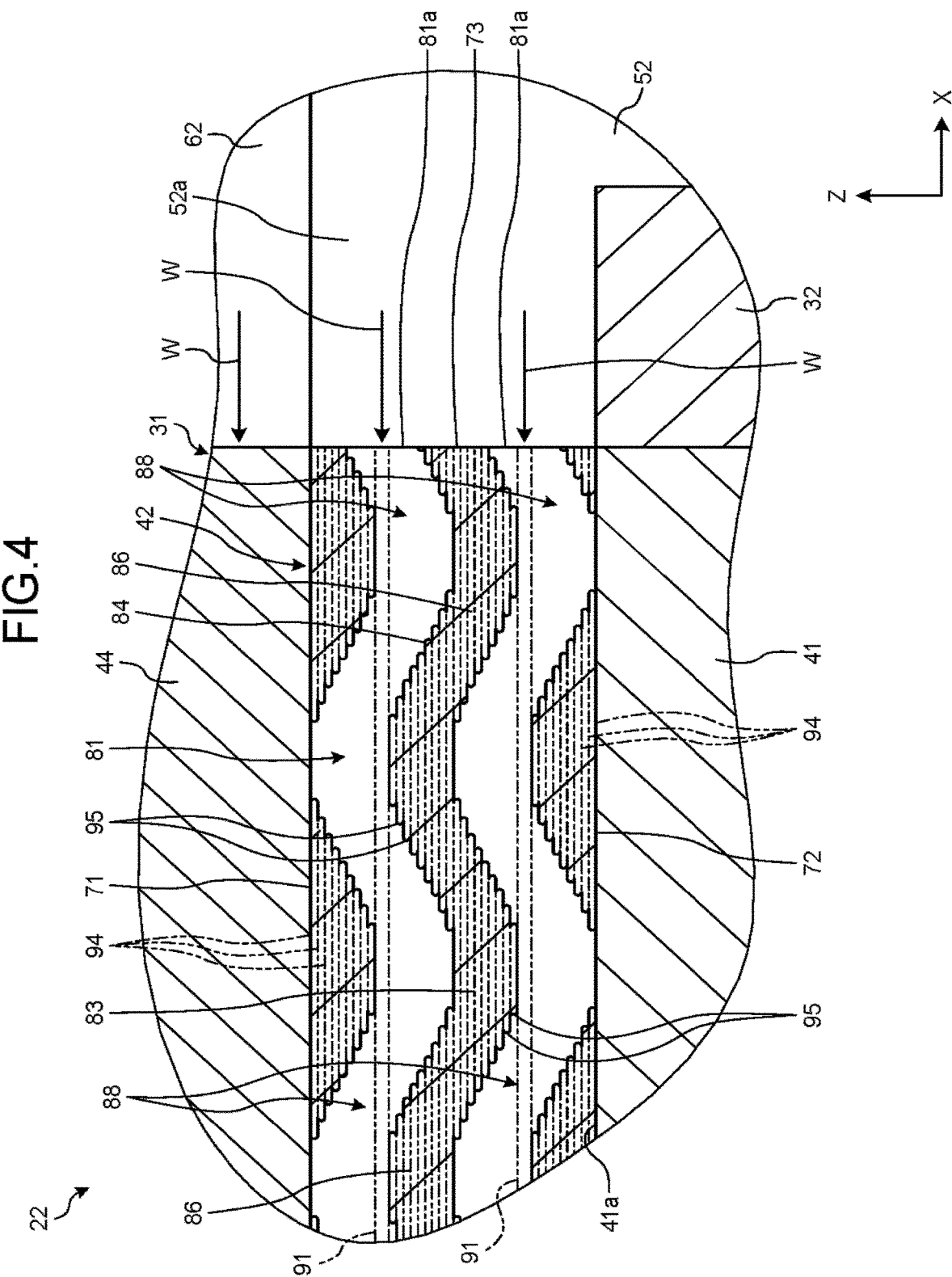
FIG. 4 is an exemplary cross-sectional view schematically illustrating a part of the unit cell around a first side face in the embodiment.
Figure 5:
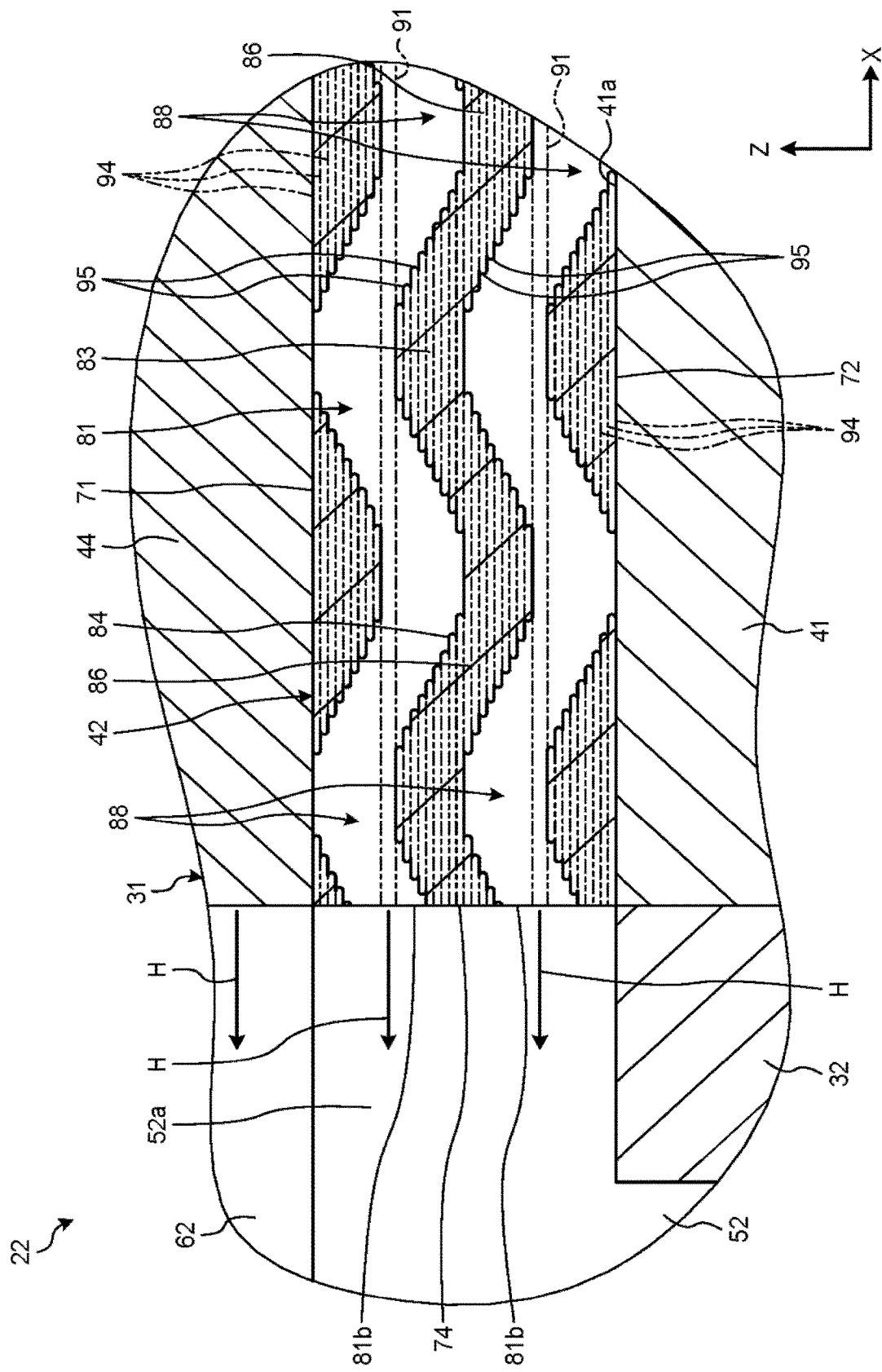
FIG. 5 is an exemplary cross-sectional view schematically illustrating a part of the unit cell around a second side face in the embodiment.
Figure 6:
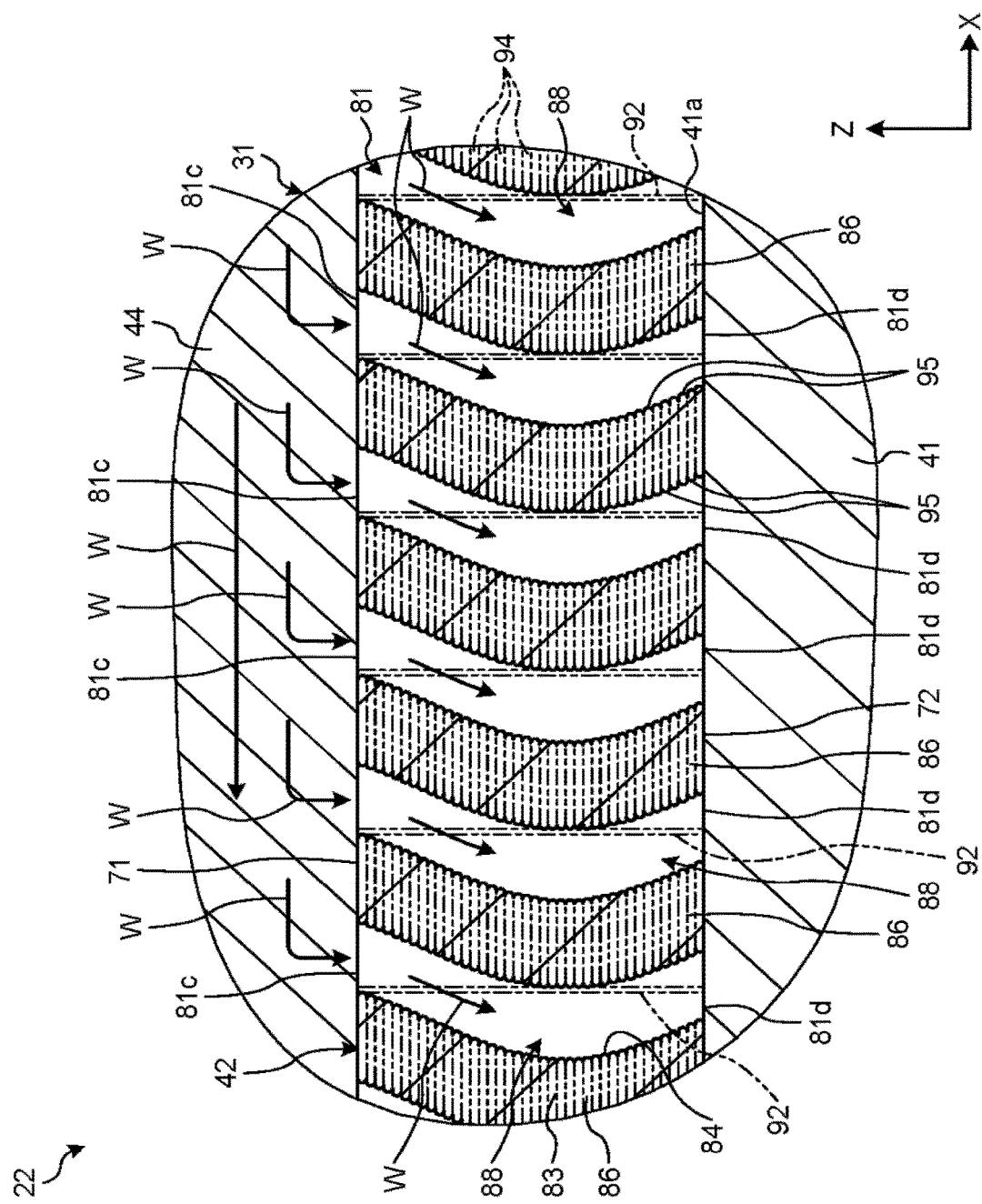
FIG. 6 is an exemplary cross-sectional view schematically illustrating another part of the unit cell in the embodiment.

FIG. 4 is an exemplary schematic cross-sectional view illustrating a part of the unit cell 22 around the first side face 73 in the embodiment. FIG. 5 is an exemplary schematic cross-sectional view illustrating a part of the unit cell 22 around the second side face 74 in the embodiment. FIG. 6 is an exemplary schematic cross-sectional view illustrating another part of the unit cell 22 in the embodiment.

FIG. 4 and FIG. 5 illustrate cross-sections of the unit cell 22 at the same Y-axial position. FIG. 6 illustrates a cross-section of the unit cell 22 at a position different from that in FIG. 4 and FIG. 5 in the Y-axis direction.

As illustrated in FIG. 4 to FIG. 6, the hydrogen electrode 42 is provided with an inside channel 81. The channel 81 has a sectional area sufficient to allow gas such as the water vapor W and the hydrogen H to pass through. In other words, gas such as the water vapor W and the hydrogen H can pass through the inside of the hydrogen electrode 42.

The hydrogen electrode 42 has a wall 88. The wall 83 has an inner wall face 84 defining the channel 81. In other words, the channel 81 is a space sectioned and/or defined by the inner wall face 84. The inner wall face 84 is oriented to the inside of the channel 81.

FIG. 7 is an exemplary perspective view illustrating a part of the hydrogen electrode 42 in the embodiment. The wall 33 includes a plurality of unit walls 86. In the present embodiment, the unit walls 86 have a gyroid shape. In other words, the unit walls 86 form a three-dimensional periodic minimal surface that can me connected infinitely in three directions. The unit walls 86 have the same shape or similar shapes. The same shape or similar shapes include different shapes due to manufacturing errors.

The unit walls 86 are connected to one another in the X-axis, Y-axis, and Z-axis directions. The unit walls 86 need to be connected to one another in at least one direction.

A part of the inner wall face 84 of the unit walls 86 forms at least part of unit passages 88 being part of the channel 81. The unit passages 88 have the same shape or similar shapes. The unit walls 86 are connected to one another, and the unit passages 88 are hence in communication with one another in the X-axis, Y-axis, and Z-axis directions. FIG. 4 to FIG. 6 schematically illustrates the channel 81 and the wall 83 so that the channel 81 and the wall 83 in FIG. 4 to FIG. 6 are different in shape from the mutually connected unit walls 86 and unit passages 88 in FIG. 7.

As described above, the channel 81 includes the unit passages 88 that have the same shape or similar shapes and communicate with one another. In other words, in the channel 81, the unit passages 88 of the came shape or similar shapes are formed repeatedly in the X-axis, Y-axis, and Z-axis directions. The unit passages 88 communicate with one another in at least one direction.

In the present embodiment, the unit passages 88 are in communication with one another to form repetitive passages of the same shape or similar shapes. Alternatively, for example, every two unit passages 88 may mutually communicate so as to be mirror symmetric to each other. Also, every two similarly-shaped unit passages 88 may communicate with each other to change the pitch with which the unit passages 88 are formed. Similarly, the unit walls 86 may be connected sc as to be mirror symmetric to each other, and may be connected at a variable pitch.

As illustrated in FIG. 4, an open end 81a of the channel 81 is opened into the first aide face 73. As illustrated in FIG. 5, an open end 81b of the channel 81 is opened into the second side face 74. As illustrated in FIG. 6, an open end 81c of the channel 81 is opened into the first contact face 71. An open end 81d is opened into the second contact face 72. Another open end of the channel 81 is opened into a side face of the hydrogen electrode 42 that is oriented in the Y-axis direction. The channel 81 may have the two open ends 81a and 81b alone, for example.

As illustrated in FIG. 4 and FIG. 5, the channel 81 includes a first, linear part 91 that linearly passes between the first, side face 73 and the second side face 74. The first linear part 91 is a part of the channel 81, and linearly extends in the X-axis direction. This makes the far side of the hydrogen electrode 42 viewable, for example, when the first side face 73 or the second side face 74 is viewed in the X-axis direction.

As illustrated in FIG. 6, the channel 81 includes a second linear part 92 that linearly passes between the first contact face 71 and the second contact face 72. The second linear part 92 is a part of the channel 81, and linearly extends in the Z-axis direction. This makes the far side of the hydrogen electrode 42 viewable, for example, when the first contact face 71 or the second contact face 72 is viewed in the Z-axis direction.

The hydrogen electrode 42 includes at plurality of layers 94, for example. The layers 94 are laminated in the Z-axis direction to form the hydrogen electrode. The Z-axis direction is a direction intersecting the first principal surface 41a, and is an example of a first direction. The layers 94 may be laminated in another direction. The layers 94 have substantially the same thickness. The thickness of the layers 94 is larger than the diameter of particles of the material of the hydrogen electrode 42.

The hydrogen electrode 42 is manufactured with a 3D printer designed for additive manufacturing (AM) by stereolithography, for example. The hydrogen electrode 42 may be manufactured by another means. The 3D printer includes, for example, a vat to be supplied with photocurable resin mixed with the material of the hydrogen electrode 42, and an optical device capable of irradiating the vat with ultraviolet laser light.

The optical device irradiates the surface of resin in the vat with ultraviolet laser light in accordance with the sectional shape of the hydrogen electrode 42. Thereby, the resin is cured to form one layer 94. The hydrogen electrode 42 is manufactured by laminating multiple layers 34. The resin contained in the layers 94 is evaporated and removed when the hydrogen electrode 42 is sintered, for example.

The inner wall face 84 is provided with a plurality of protrusions 95. The protrusions 95 protrude to the inside of the channel 81 and have an arc-like cross-section. For example, the protrusions 95 are formed sat X-axial and Y-axial ends of the layers 94 by stereolithography. The X-axis and Y-axis directions are along the first principal surface 41a, and are examples of the second direction.

The protrusions 95 protrude in a direction intersecting the direction in which the layers 94 are laminated. The protrusions 95 are aligned in the laminated direction of the layers 94. The protrusions 95 are not limited to this example, and may be created by another method.

The channel 81 has a substantially circular cross-section. The diameter of the channel 81 is larger than the thickness (pitch) of each of the layers 94. In the present embodiment the diameter of the channel 81 is, for example, equal to the length between the two Z-axial ends of the channel 81.

Figure 8:
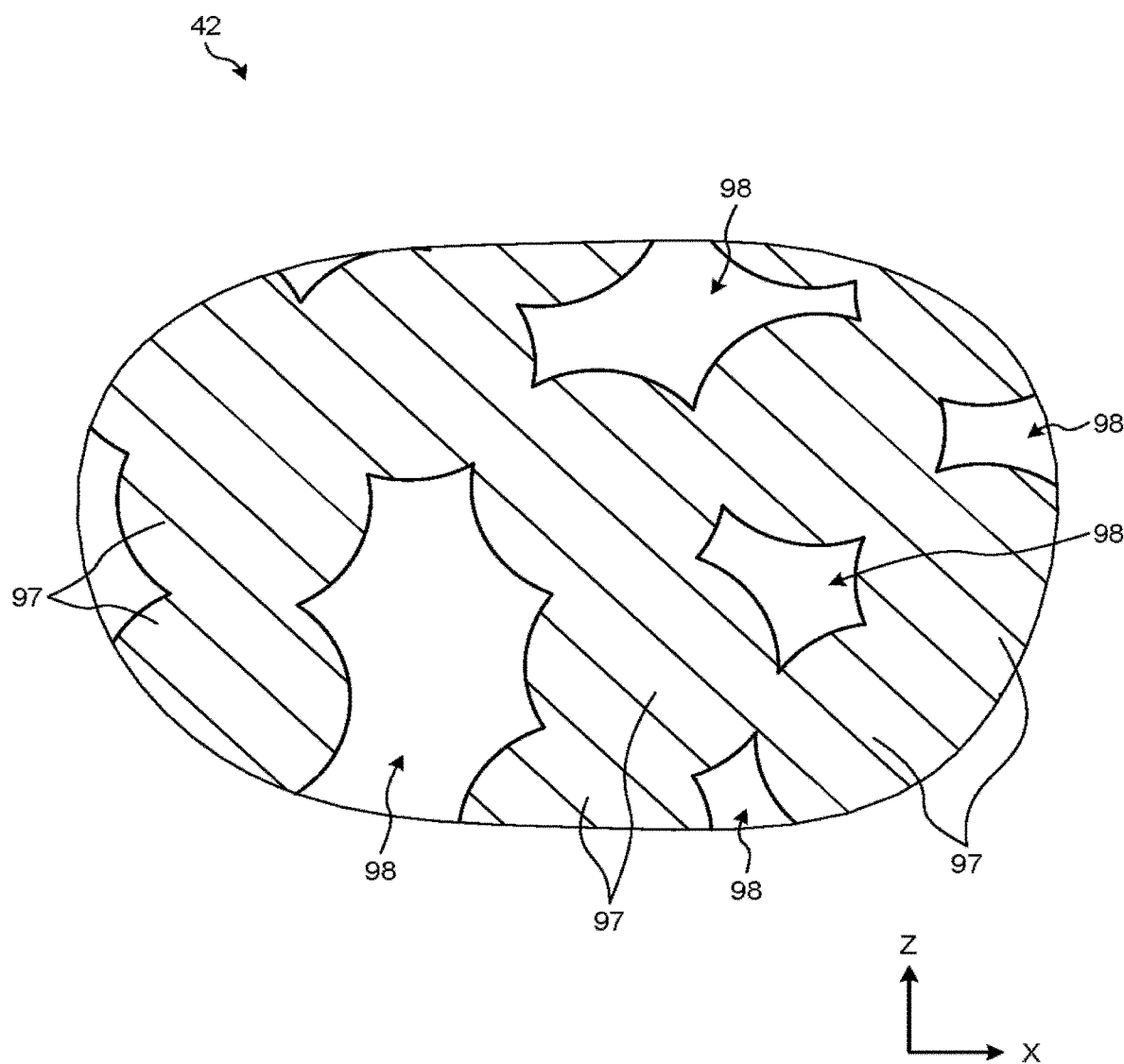
FIG. 8 is an exemplary view microscopically and schematically illustrating the inside of the hydrogen electrode in the embodiment.

FIG. 8 is an exemplary schematic diagram microscopically illustrating the inside of the hydrogen electrode 42 in the embodiment. As illustrated in FIG. 8, the hydrogen electrode 42 includes a plurality of particles 97. The particles 97 are particles of the material of the hydrogen electrode 42. In the present embodiment, the particles 97 include nickel particles 97 and zirconia-based oxide particles 97. In FIG. 3, the nickel particles 97 and the zirconia-based oxide particles 97 are illustrated by the same hatching.

For example, the particles 97 are coupled to one another by sintering. The hydrogen electrode 42 has conductivity due to the coupled nickel particles 97. The hydrogen electrode 42 also has ion conductivity due to the coupled zirconia-based oxide particles 97.

The voids 98 are formed among the particles 97. In other words, the voids 98 occur inside the hydrogen electrode 42. The voids 98 can be referred to also as spaces, gaps, channels, or passages, for example.

The voids 98 include open pores that open into the surface of the hydrogen electrode 42, such as the first contact face 71, the second contact face 72, the first side face 73, and the second side face 74. The open pores of the voids 98 are in communication with the channel 81. The voids 98 may include closed pores.

The average sectional area of the channel 81 is larger than the average sectional area of the voids 98. In the present embodiment, at least part of the voids 98 has a sectional area sufficient to allow gas such as the water vapor W and the hydrogen H to pass through. The particles 97 in the hydrogen electrode 42 may have denseness sufficient to restrict the gas from passing.

The channel 81 contributes to increasing the open porosity of the hydrogen electrode 42 by larger then 40%, for example. In the present embodiment, the open porosity of the hydrogen electrode 42 can be set to about 80%, for example. Irrespective of a larger open porosity of the hydrogen electrode 42, the wall 83 of the hydrogen electrode 42 maintains denseness enough to be able to resist the force of gravity, gas such as the water vapor W and the hydrogen H, and external force from the other members such as the separators 33.

The oxygen electrode 43 has substantially the same shape as that of the hydrogen electrode 42 as described above. Specifically, the oxygen electrode 43 also has a first contact face 71, a second contact face 72, a first side face 73, a second side face 74, a wall 83, a plurality of layers 94, and a plurality of particles 97. In the oxygen electrode 43, the first contact face 71 contacts the second principal surface 41b of the solid electrolyte layer 41. The second contact face 72 contacts the current collector 34. The particles 97 of the oxygen electrode 48 are lanthanum strontium oxide particles 97. The oxygen electrode 43 is also provided with the channel 81 and the voids 98 inside.

The oxygen electrode 43 may have a shape different from that of the hydrogen electrode 42. For example, the oxygen electrode 43 may be a porous medium manufactured from pore-forming materials or by thermal spraying. In this case, gas such as oxygen can pass through voids among the particles in the oxygen electrode 43.

As illustrated in FIG. 2, the water vapor W is supplied to one of the sets of communicating first supply paths 52, 55, 62, and 66. For example, the first supply paths 52, 55, 62, and 66 are connected to the heat storage 14 through the pipe 16 in FIG. 1.

As illustrated in FIG. 4, for example, the water vapor W flows to the first side face 73 of the hydrogen electrode 42 through the connection 52a of the first supply path 52. The water vapor W than flows into the channel 81 through the open end 81a in the first side face 73. A part of the water vapor W may flow into open pores of the voids 98 opening into the first side face 73. As illustrated in FIG. 6, a part of the water vapor W may flow into the channel 81 from the open end 81c in the first contact face 71 through the support 44 and the current, collector 34.

Flowing into the channel 81, the water vapor W diffuses along the channel 81 in the X-axis direction, the Y-axis direction, and the 2-axis direction. In the channel 81, the water vapor W contacts the particles 97 forming the inner wall face 84.

Power supply to the hydrogen electrode 42 through the separators 33, the current collectors 34, and the support 44 causes electrochemical reaction at the three-phase boundary of the nickel particles 97, the zirconia-based oxide particles 97, and the water vapor W. The water vapor W is decomposed into hydrogen H and oxygen ions due to the electrochemical reaction. The particles 97 are sintered so as to have denseness enough to form the inner wall face 84, which enables more electrons to pass through the nickel particles 97, and accelerates the electrochemical reaction.

As illustrated in FIG. 5, the hydrogen H flows out of the open end 81b of the channel 81 in the second side face 74. The hydrogen H is supplied to the other of the sets of first supply paths 52, 55, 62, and 66 in communication with one another through the connection 52a of the first supply path 52. Unreacted water vapor W may be supplied to the other of the sets of first supply paths 52, 55, 62, and 66 together with the hydrogen H.

The hydrogen H is supplied to the hydrogen storage 13 from the other of the sets of first supply paths 52, 55, 62, and 66 through the pipe 15 in FIG. 1. The water vapor W mixed with the hydrogen H is separated from the hydrogen H by a condenser, for example.

Oxygen ions move to the solid electrolyte layer 41 through the mutually coupled zirconia-based oxide particles 97. The particles 97 are sintered so as to have denseness enough to form the inner wall face 84, which enables more oxygen ions to pass through the zirconia-based oxide particles 97, and accelerates electrochemical reaction. The oxygen ions reach the oxygen electrode 45 through the solid electrolyte layer 41, and are dissociated at the oxygen electrode 43.

Oxygen produced at the oxygen electrode 43 flows out of the oxygen electrode 43 through the channel 81. The oxygen is supplied to the communicating second supply paths 53, 56, 63, and 67 through the connections 33a of the second supply paths 53. The oxygen is supplied to the oxygen storage or released to the air through the second supply paths 53, 56, 63, and 67.

As described above, while passing through the channel 81 in the hydrogen electrode 42, the water vapor W contacts the nickel particles 97 and the zirconia-based oxide particles 97 forming the inner wall face 84, and is thereby electrolyzed into hydrogen H and oxygen. In addition, The water vapor W, while passing through the voids 98 in the hydrogen electrode 42, may be electrolysed by contacting the nickel particles 97 and the zirconia-based oxide particles 97.

The SOFC 12 also includes the same cell stack 21 as described above, as with the SOEC 11. That is, the SOFC 12 also includes an electrochemical cell 31.

In the SOFC 12, hydrogen H is supplied to the channel 81 in the hydrogen electrode 42 from the hydrogen storage 13 through the pipe 17 in FIG. 1. Oxygen is supplied to the channel 81 in the oxygen electrode 43. In this manner the electrochemical cell 31 generates power and produces water (water vapor W) at the hydrogen electrode 42.

In the power system 10 according to one embodiment described above, the hydrogen electrode 42 is provided with the inside channel 81 which has the open ends 81a and 81b in the first, side face 73 and the second side face 74 and allows the water vapor W and the hydrogen H to pass therethrough. In other words, the water vapor W and the hydrogen H can be directly poured into the channel 81 in the hydrogen electrode 42. Thus, for example, in the SOEC 11 or the SOFC 12 including the hydrogen electrode 42, the water vapor W or the hydrogen H supplied into the channel 81 easily diffuse inside the hydrogen electrode 42, ensuring the contact area between the water vapor W or the hydrogen H and the hydrogen electrode 42. The inner wall face 84 is formed by agglomerating the nickel particles 97 and the zirconia-based oxide particles 97 by sintering, for example. The zirconia-based oxide particles 97 are agglomerated in surface contact with one another, thereby enlarging the pathway in which oxygen ions are movable and making the oxygen ions easily moveable in the hydrogen electrode 42. The nickel particles 97 are agglomerated in surface contact with one another, making electrons easily movable in the hydrogen electrode 42. Thereby, the efficiency of electrochemical reaction in the electrochemical cell 31 is improved.

The channel 81 includes the unit passages 88 that have the same shape or similar shapes and are in communication with one another. In other words, the channel 81 extends regularly. For example, in forming electrodes from pore-forming materials or by thermal spraying, in general, passages of arbitrary shape may be formed among the particles. However, water vapor W and hydrogen H can more easily diffuse in the regularly extending channel 81 of the present embodiment than in the passages of arbitrary shape. The passage of arbitrary shape may have closed pores and/or decreases in sectional area as water vapor K and hydrogen H is further restricted from passing. Consequently, the efficiency of electrochemical reaction in the electrochemical cell 31 is improved.

The inner v/all face 84 is provided with the protrusions 95 that protrude to the inside of the channel 81. The protrusions 95 increase the surface area of the inner wall face 84. For example, in the SOEC 11 or the SOFC 12 including the hydrogen electrode 42, the contact area (reaction area) between the water vapor W or the hydrogen H supplied to the channel 81 and the inner wall face 84 of the hydrogen electrode 42 increases, improving the efficiency of electrochemical reaction in the electrochemical cell 31.

The protrusions 95 are provided at the X-axial and Y-axial ends of the layers 94, the X-axis direction and Y-axis direction being directions along the first principal surface 41a. For example, the hydrogen electrode 42 can be manufactured by forming the layers 94 by stereolithography. In stereolithography, the ends of the layers 94 exhibit an arc-like convex shape. In other words, the protrusions 95 of the inner wall face 84 can be easily formed by means involving formation of the layers 94, such as stereolithography. Thus, the protrusions 95 can be easily formed.

The first side face 73 is oriented in the positive X-axis direction, and the second side face 74 is oriented in the negative X-axis direction. The positive and negative X-axis directions intersect the direction in which the first principal surface 41a is oriented. Thereby, the water vapor W and the hydrogen H can flow into one open end 81a of the channel 81 in the first side face 73, and flow out of the other open end 81b of the channel 81 in the second side face 74. This makes it easier for the water vapor W and the hydrogen H to pass through the channel 81 inside the hydrogen electrode 42. In the SOEC 11 or the SOFC 12 equipped with the hydrogen electrode 42, for example, the water vapor W or the hydrogen H supplied to the channel 81 easily diffuses inside the hydrogen electrode 42. This also eliminates the necessity to form channels in the separators 33, leading to reducing the thickness of the electrochemical cell 31.

The channel 81 includes a first linear part 91 that linearly passes between the first side face 73 and the second side face 74. This makes it easier for the water vapor W and the hydrogen H to linearly flow between both of the open ends 81a and 81b of the channel 81 in the first side face 73 and in the second side face 74. Consequently, in the SOEC 11 or the SOFC 12 equipped with the hydrogen electrode 42, for example, the water vapor W or the hydrogen H supplied to the channel 81 easily diffuses inside the hydrogen electrode 42.

In the hydrogen electrode 42, the average sectional area of the channel 81 is larger than the average sectional area of the voids 98 among the particles 97. Thus, the water vapor W and the hydrogen K can easily pass through the channel 81, and the water vapor W or the hydrogen H supplied to the channel 81 can easily diffuse inside the hydrogen electrode 42. Consequently, the efficiency of electrochemical reaction in the electrochemical cell 31 is improved.

The voids 98 have a size sufficient to allow the water vapor W and the hydrogen H to pass therethrough. Thus, in the SOEC 11 or the SOFC 12 equipped with the hydrogen electrode 42, for example, the contact area between the hydrogen electrode 42 and the water vapor W and the hydrogen H supplied to the channel 81 can increase, improving the efficiency of electrochemical reaction in the electrochemical cell 31.

The length between both ends of the channel 81 in the direction in which the layers 94 are laminated is longer than the length of each of the layers 94. This makes it easier for the water vapor W and the hydrogen H to pass through the channel 81, and for the water vapor W or the hydrogen H supplied to the channel 81 to diffuse inside the hydrogen electrode 42. Consequently, the efficiency of electrochemical reaction in the electrochemical cell 31 is improved.

The above embodiment, has described the example of the channel 81 in wave form of the continuous unit passages 88. However, the channel 81 may be formed into another shape such as a straight line. In the above embodiment, the channel 81 is adjacent to the solid electrolyte layer 41. However, the channel 81 may be isolated from the solid electrolyte layer 41 by the wall 83, for example.

In the above embodiment, the support 44 is placed on the hydrogen electrode 42. However, the support 44 may be placed on the oxygen electrode 43, for example. In this case the support 44 is, for example, made of the same or similar material to the material of the oxygen electrode 43, and has oxidation resistance. The oxygen electrode 43 is located between the solid electrolyte layer 41 and the support 44. The support 44 may allow gas such as oxygen to pass therethrough, or may have denseness sufficient to restrict gas from passing.

According to one embodiment described above, the first electrode is provided with the inside channel formed by the inner wall face and allowing gas to pass therethrough. Thereby, the efficiency of electrochemical reaction in the electrochemical cell is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electrochemical cell, comprising:
a solid electrolyte layer having a first face and a second face, the solid electrolyte layer having insulating property and allowing ions to move therethrough;

a first electrode being one of an anode and a cathode, the first electrode being provided on the first face, the first electrode provided with an inside channel, the first electrode including a third face, a fourth face, and an inner wall face, the channel through which gas passes, the third face into which a first open end of the channel opens, the fourth face into which a second open end of the channel opens, the inner wall face that defines the channel; and a second electrode being the other of the anode and the cathode, the second electrode being provided on the second face, wherein the channel includes a plurality of unit passages that have the same shape or similar shapes and communicate with one another, the first electrode includes a plurality of unit walls that are connected to one another in three directions perpendicular to one another, include at least part of the inner wall face, and form the plurality of unit passages, the plurality of unit passages communicate with one another in the three directions by connecting the plurality of unit walls to one another in the three directions, the plurality of unit walls have a same shape or similar shapes and form a three-dimensional periodic minimal surface that can be connected infinitely in the three directions, the plurality of unit walls have a gyroid shape, and the inner wall face includes a plurality of protrusions that protrudes to inside of the channel.

2. The electrochemical cell according to claim 1, wherein the first electrode includes a plurality of layers laminated in a first direction intersecting the first face, and the protrusions are located at an end of the layers in a second direction that is along the first face.

3. The electrochemical cell according to claim 1, wherein the third face is oriented in a third direction intersecting a direction in which the first face is oriented, and the fourth face is oriented in a fourth direction intersecting the direction in which the first face is oriented.

4. The electrochemical cell according to claim 1, wherein the third face is opposite the fourth face, and the channel includes a part that linearly passes between the third face and the fourth face.

5. The electrochemical cell according to claim 1, wherein the first electrode includes a plurality of particles coupled to one another with a void in-between between the particles, and the channel has an average sectional area larger than an average sectional area of the void.

6. The electrochemical cell according to claim 5, wherein the void allows the gas to pass through.

7. An electrochemical cell comprising:

a solid electrolyte layer having a first face and a second face, the solid electrolyte layer having insulating property and allowing ions to move therethrough;

a first electrode being one of an anode and a cathode, the first electrode being provided on the first face, the first electrode provided with an inside channel, the first electrode including a third face, a fourth face, and an inner wall face, the channel through which gas passes, the third face into which a first open end of the channel opens, the fourth face into which a second open end of the channel opens, the inner wall face that defines the channel; and a second electrode being the other of the anode and the cathode, the second electrode being provided on the second face, wherein the channel includes a plurality of unit passages that have the same shape or similar shapes and communicate with one another, the first electrode includes a plurality of unit walls that are connected to one another in three directions perpendicular to one another, include at least part of the inner wall face, and form the plurality of unit passages, the plurality of unit passages communicate with one another in the three directions by connecting the plurality of unit walls to one another in the three directions, the plurality of unit walls have a same shape or similar shapes and form a three-dimensional periodic minimal surface that can be connected infinitely in the three directions, the plurality of unit walls have a gyroid shape, the first electrode includes a plurality of laminated layers, and a length between both ends of the channel in a laminated direction of the layers is larger than a thickness of each of the layers.

8. An electrochemical apparatus, comprising:

the electrochemical cell according to claim 1; and a supplier that supplies gas to the channel.

9. The electrochemical cell according to claim 1, wherein each of the unit walls is connected to another unit wall in an X direction, is connected to another unit wall in a Y direction perpendicular to the X direction, and is connected to another unit wall in a Z direction perpendicular to the X direction and the Y direction.

10. The electrochemical apparatus according to claim 8, wherein each of the unit walls is connected to another unit wall in a X direction, is connected to another unit wall in a Y direction perpendicular to the X direction, and is connected to another unit wall in a Z direction perpendicular to the X direction and the Y direction.

* * * * *